May 24, 1938.  C. H. NORDELL  2,118,266
SEWAGE TREATMENT
Filed June 29, 1936
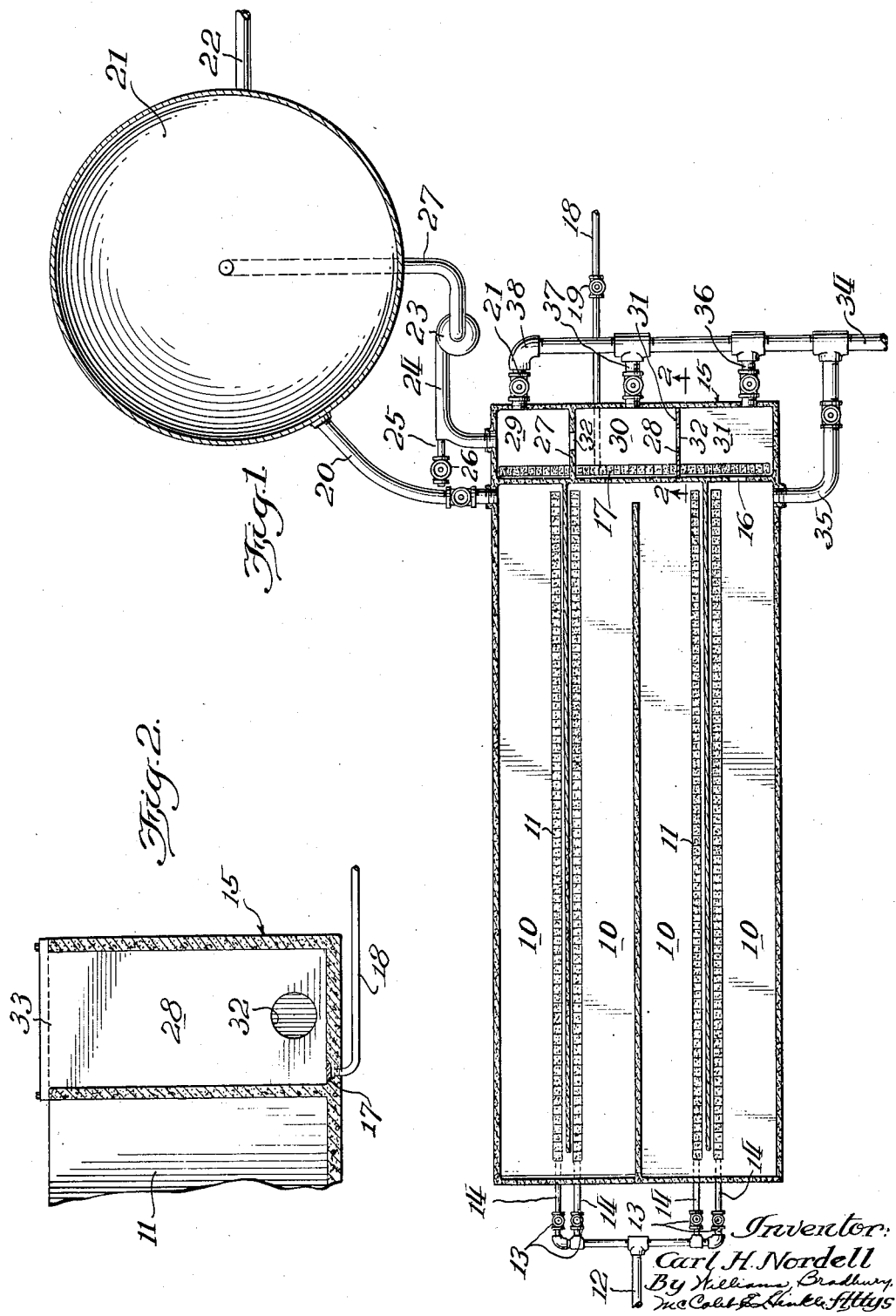

Patented May 24, 1938

2,118,266

UNITED STATES PATENT OFFICE 2,118,266

SEWAGE TREATMENT

Carl H. Nordell, Chicago, Ill., assignor to Advance Engineering Company, Chicago, Ill., a corporation of Illinois Application June 29, 1936, Serial No. 87,885

4 Claims. (Cl. 210—8)

This invention relates to the treatment of sewage, and particularly to the treatment of sewage with the so-called activated sludge process in which the incoming sewage is mixed with sludge resulting from the process and the mixed liquid is subjected to aeration.

In all sewage treatment systems the amount of sewage to be treated and the strength or concentration of the sewage is subject to very considerable fluctuations. Rainstorms cause considerable changes of volume and strength in the case of combined surface water and sewage systems. Changes in volume and strength occur periodically. Thus, during any twenty-four hour period the strength of sewage varies within very wide limits. During the night and early morning the incoming flow may be mainly water which drains from the ground into the sewers. In the forenoon the amount of excreta collected by the system may attain peak proportions. Another factor which may give a peak load of short duration is the delivery of trade wastes into the sewage system.

In my copending application, Serial No. 41,741, filed September 23, 1935, I have described and claimed a method of controlling the air supply for the effective treatment of sewage of any prevailing strength and rate of supply.

The present invention relates primarily to a method in which the sludge admixed with the sewage is preconditioned and controlled. Thus, generally stated in times of low load I accumulate a charge of sludge and maitnain it at a high degree of efficiency by supplying an appropriate amount of air thereto. In the preferred manner of operation I pass sludge continuously from the accumulating mass into admixture with the incoming sewage. When the sewage becomes stronger I may supply an extra quantity of sludge to the incoming sewage. This extra quantity I deliver over a period of time or practically immediately depending upon the nature of the change in the strength of the sewage. Thus, in the event of a daily periodic peak load of several hours' duration I add the extra quantity of preconditioned supply of sludge gradually over several hours of time. In the case of a sudden change of strength due to the dumping of a large amount of trade wastes into the sewage system, the additional amount of sludge may be brought into the aeration system practically instantaneously.

One of the important advantages of my new method lies in the fact that the tank in which the sludge is accumulated and held in preconditioned state becomes immediately available for sewage aeration when a peak load needs to be treated. Conversely, when a weak or light oxidation load is being received and a charge of preconditioned sludge is being accumulated, only part of the aerating tank system may be used for sewage treatment, a condition which is particularly adapted for efficient operation.

The invention will more fully be understood from the following description of a preferred method of operation as practiced in a suitable apparatus illustrated in the accompanying drawing in which:

Figure 1 is a diagrammatic sectional plan view of a sewage treatment apparatus, and Fig. 2 is a sectional detail view taken on the line 2—2 of Fig. 1.

Referring to the drawing, the main aeration tanks are indicated by the reference numerals 10. These tanks are connected in series and are arranged alongside each other. It will be understood that this location of aeration tanks is merely one conventional arrangement which may be employed.

Each tank 10 is provided with a suitable aerator 11 which may be supplied with compresed air from a pipe 12, the supply to each aerator being controlled by valve 13 in the branch supply pipes 14.

An auxiliary tank 15 is provided which discharges into the inlet end of the first tank 10 through an opening 16. The tank 15 is provided with a suitable aerator 17, which is supplied with air from a pipe 18, the supply being controlled by a valve 19.

The treated sewage passes from the outlet end of the last tank 10 through a pipe 20 to a settling tank 21. Effluent flows out of this tank by the overflow pipe 22. Sludge is drawn from the bottom of the settling tank 21 by pump 23 and is passed by pipe 24 to the inlet end of the tank 15. A suitable amount of sludge may be withdrawn continuously, or from time to time, by means of a pipe 25, and the amount of sludge in the system may be controlled by means of the valve 26.

The tank 15 may be provided with one or more partitions 27 and 28 which separate it effectively into a plurality of compartments 29, 30 and 31, for example. The partitions 27 and 28 are provided with suitable openings 32, which are of adequate size to enable the sludge to flow from the inlet to the outlet end of the tank 15, while small enough to avoid any objectionable degree of flow in the opposite direction. The partition 27 is shown as permanently installed. The partition 28 is movable along the tank being preferably supported from a beam 33 which may rest upon the upper tank walls, as shown in Fig. 2.

The sewage is supplied by the pipe 34. The pipe 34 is connected by valved branch pipes 35, 36, 37 and 38, to the inlet end of the first tank 10, and to the compartments 31, 30, and 29, respectively.

In the normal operation of the process, sludge is accumulated in the tank 15 and is maintained preconditioned or in a highly active state by the expedient of subjecting it to a suitable degree of aeration by air supplied by pipe 18. Thus, when the incoming sewage is scant or weak, it is delivered through the pipe 35 directly into the tanks 10. The sludge supplied by the pump 23 builds up in the compartments 29, 30 and 31, a certain amount passing continuously through the opening 16 into the first tank 10, where it is admixed with the incoming sewage. The quantity of sludge builds up in the tank 15 until a static condition is attained, as much sludge passing out of the tank 15 as enters it. This gradual increase of sludge supply to the aeration tanks may, in some cases, be arranged to take care of certain diurnal changes of quantity and strength of the incoming sewage. When a peak load is being received the amount of sludge necessary for the effective treatment of the sewage is very high and all or a part of the sewage is diverted by one or more of the pipes 36, 37 and 38 into the tank 15. It will be seen that a small supply of sewage into one of these pipes will give an immediate corresponding increase to the sludge supplied to the reaction chambers 10 through the opening 16. If a very heavy peak load arrives, due, for example, to the sudden discharge of a large amount of trade waste into the sewage system, all the sewage may be diverted into the tank 15. Thus, the whole sewage supply may be diverted into the compartment 31, with the result that all the sludge therein is immediately thrown into use. When this is done the compartment 31 serves as an aerating tank and thus temporarily augments the aeration capacity of the system at the time that an increase of capacity is urgently needed. This procedure may be repeated successively with the other compartments 30 and 29, with the result that the whole reserve supply of preconditioned sludge and the whole reserve aeration space of the tank 15 is thrown into action.

It will be understood that the amounts of air supplied and the rate of sludge supply will depend upon the volume of the incoming sewage and its strength. These factors may readily be determined in the manner and with the apparatus described in my copending patent applications Serial No. 41,751 filed September 23, 1935 and Serial No. 41,750 filed September 23, 1935.

Having thus described my invention, what I claim as new and desire to secure by Letters Patent of the United States is:

1. The method of treating sewage which comprises subjecting sewage to aeration in an aerating zone, separating activated sludge from the treated sewage, returning a portion of said sludge to the aerating zone, accumulating a body of activated sludge in a preconditioning zone, and diverting at least a part of the sewage into the preconditioning zone and thereby displacing a quantity of sludge into the aerating zone.

2. The method of treating sewage which comprises subjecting sewage to aeration in an aerating zone, separating activated sludge from the treated sewage, passing said sludge to a preconditioning zone communicating with said aerating zone, and thereby displacing a corresponding volume of activated sludge into said aerating zone, and diverting at least a part of sewage into said preconditioning zone and thereby increasing the quantity of activated sludge displaced into the aerating zone.

3. The method of treating sewage which comprises subjecting sewage to aeration in an aerating zone, separating activated sludge from the treated sewage, returning a part of said sludge to the aerating zone, accumulating a body of activated sludge in a preconditioning zone, diverting at least a part of the sewage into the preconditioning zone and thereby displacing a further quantity of sludge into the aerating zone, and thereafter diverting the supply of sewage directly into the aerating zone and accumulating a new supply of sludge in the preconditioning zone.

4. The method of treating sewage which comprises subjecting sewage to aeration in an aerating zone, separating activated sludge from the treated sewage, passing said sludge to a preconditioning zone communicating with said aerating zone, thereby displacing a supply of activated sludge into said aerating zone, diverting at least a part of sewage into said preconditioning zone and thereby increasing the quantity of activated sludge displaced into the aerating zone, and thereafter diverting the supply of sewage directly into the aerating zone and accumulating a new supply of sludge in the preconditioning zone.

CARL H. NORDELL.